US006865765B2

(12) United States Patent
Aalbers

(10) Patent No.: US 6,865,765 B2
(45) Date of Patent: Mar. 15, 2005

(54) CONTAMINANT REMOVAL TAPE ASSEMBLY, A ROLL OF CONTAMINANT REMOVAL TAPE, AND METHODS OF REMOVING CONTAMINANTS FROM A SURFACE

(75) Inventor: Barbara J. Aalbers, Tucson, AZ (US)

(73) Assignee: 3M Innovative Properties Company, St. Paul, MN (US)

( * ) Notice: Subject to any disclaimer, the term of this patent is extended or adjusted under 35 U.S.C. 154(b) by 91 days.

(21) Appl. No.: 10/219,005

(22) Filed: Aug. 14, 2002

(65) Prior Publication Data

US 2003/0039824 A1 Feb. 27, 2003

Related U.S. Application Data

(63) Continuation-in-part of application No. 09/932,292, filed on Aug. 17, 2001, now abandoned.

(51) Int. Cl.$^7$ .............................................. A47L 25/00
(52) U.S. Cl. .................. 15/104.002; 428/343; 428/906; 428/43; 428/163; 428/167
(58) Field of Search ................................ 428/343, 906, 428/43, 163, 167, 174; 15/104.002

(56) References Cited

U.S. PATENT DOCUMENTS

| | | | |
|---|---|---|---|
| 3,115,417 A | * | 12/1963 | Christenson ............... 117/33.5 |
| 3,906,578 A | | 9/1975 | Huber |
| 4,139,669 A | * | 2/1979 | Chang ......................... 428/167 |
| 4,237,889 A | | 12/1980 | Gobran |
| 4,361,923 A | | 12/1982 | McKay |
| 4,399,579 A | | 8/1983 | McKay |
| 4,422,201 A | | 12/1983 | McKay |
| D273,059 S | | 3/1984 | McKay |
| D276,763 S | | 12/1984 | McKay |
| D281,654 S | | 12/1985 | Bladh et al. |
| D288,973 S | | 3/1987 | Hamazaki |

(List continued on next page.)

FOREIGN PATENT DOCUMENTS

| | | |
|---|---|---|
| DE | 9202836 | 6/1992 |
| EP | 0061048 | 9/1982 |
| GB | 2204228 | 11/1988 |
| JP | HEI 5-171116 | 9/1993 |
| JP | 09224895 | 9/1997 |
| WO | WO 0180705 | 11/2001 |

OTHER PUBLICATIONS

Certification & Calibration Services, Inc., "Adhesive Roller," 1 page, [retrieved from the internet on Feb. 13, 2002], URL http://www.cleanroomcerts.com/c1ntckrllr.htm.
Satas, Ed., *Handbook of Pressure Sensitive Adhesives*, Third Ed. Edited by Donatas Satas, Satas & Associates, pp. 4–7, 1999.
*Adhesion and Adhesives Technology and Introduction*, pp. 216–245, Alphonsus V. Pocius, Hanser Garner Publications, Inc., 1997.
Brochure entitled "3M Lint Removal Products," date unknown.
Satas, Ed., *Handbook of Pressure Sensitive Adhesive Technology*, "Acrylic Adhesives", Second Edition, Edited by Donatas Satas, pp. 396–456, 1989.

*Primary Examiner*—Daniel Zirker
(74) *Attorney, Agent, or Firm*—David B. Patchett

(57) ABSTRACT

A contaminant removal tape assembly. The contaminant removal tape assembly includes an applicator and a roll of contaminant removal tape mounted on the applicator, where the roll of contaminant removal tape includes a backing having a first side and a second side opposite the first side, a layer of adhesive on the first side of the backing, wherein the layer of adhesive is arranged so as to have discontinuous contact with a surface to which the roll is applied, where the roll includes a plurality of wraps of the tape with the layer of adhesive facing outwardly away from the center of the roll of tape.

51 Claims, 5 Drawing Sheets

U.S. PATENT DOCUMENTS

| | | | |
|---|---|---|---|
| 4,781,957 A | * 11/1988 | Brown et al. | 428/43 |
| 4,898,762 A | * 2/1990 | Brown et al. | 428/152 |
| 4,905,337 A | 3/1990 | McKay | |
| 5,027,465 A | 7/1991 | McKay | |
| D336,784 S | 6/1993 | Yen | |
| 5,356,706 A | 10/1994 | Shores | |
| 5,388,300 A | 2/1995 | Hickey | |
| 5,543,706 A | 8/1996 | Rolff | |
| 5,650,215 A | 7/1997 | Mazurek et al. | |
| 5,763,038 A | 6/1998 | Wood | |
| D396,906 S | 8/1998 | Medici | |
| 5,878,457 A | 3/1999 | Cox et al. | |
| 5,940,921 A | 8/1999 | Wood et al. | |
| 6,014,788 A | 1/2000 | Jaffri | |
| 6,055,695 A | 5/2000 | McKay, Jr. | |
| 6,127,014 A | 10/2000 | McKay, Jr. | |
| 6,197,397 B1 | 3/2001 | Sher et al. | |

\* cited by examiner

CONTAMINANT REMOVAL TAPE ASSEMBLY, A ROLL OF CONTAMINANT REMOVAL TAPE, AND METHODS OF REMOVING CONTAMINANTS FROM A SURFACE

CROSS-REFERENCE TO RELATED APPLICATIONS

This application is a continuation-in-part of U.S. patent application Ser. No. 09/932,292, filed on Aug. 17, 2001, now abandoned.

TECHNICAL FIELD

The present invention relates generally to a contaminant removal tape assembly, a roll of contaminant removal tape, and methods of removing contaminants from a surface. The present invention relates more particularly to a contaminant removal tape assembly including an applicator and a roll of contaminant removal tape that has a layer of adhesive with a discontinuous contact profile, and method of using such a contaminant removal tape assembly.

BACKGROUND OF THE INVENTION

A variety of lint removal devices are known. Lint removal devices remove lint and other small particles or contaminants, such as hair or threads, from a surface, such as clothing. One known form of a lint removal device includes lint removal tape, which is used while still on a roll to remove lint and other small particles from the surface. In roll form, lint removal tape is typically wound on a core with the adhesive side of the tape wound outwardly for use. The lint removal tape roll is rolled against the surface to remove the lint and other small particles or contaminants from the surface. The lint, small particles and other contaminants adhere to the adhesive side of the lint removal tape. When the outer wrap of the lint removal tape is saturated with the lint, small particles and other contaminants, the outer wrap of the tape is removed from the roll to discard it. A roll of lint removal tape is generally used on an applicator.

U.S. Pat. No. 5,940,921 (Wood et al.), "Applicator for a Coreless Tape Roll," in its abstract, describes an applicator for a lint removal device that includes a handle portion connected to a tape-receiving portion. The tape-receiving portion includes a tape-receiving surface, an inner lip, a tapered outer lip, and grooves adjacent the lips. This patent also describes a roll of lint removal tape. In column 2, lines 41–43 of the patent, the lint removal tape is described as including a backing that could be made of backing material which is compostible or degradable, could be colored, could be printed, or could be of different surface textures or embossed, without providing any additional details as to which side is embossed.

U.S. Pat. No. 5,763,038 (Wood), "Progressively Perforated Tape Roll," in its abstract, describes a tape including a backing layer and an adhesive layer formed on the backing layer. A plurality of lines of perforations extend across the tape to separate the tape into sheets. The sheets have progressively increasing lengths such that when the sheets are wound into a roll, each sheet is longer than the sheet underneath it. When in a roll, the outermost sheet covers all of the lines of perforations to reduce instances of the tape tearing in a downweb direction.

U.S. Pat. No. 5,027,465 (McKay), "Lint Remover," in its abstract, describes a lint remover roller assembly having a pressure sensitive adhesive tape roll in association therewith. The pressure sensitive adhesive tape roll comprises a layer of adhesive tape with the adhesive surface thereof facing outwardly so as to remove lint and/or other foreign particles from fabric surfaces over which it is rolled. The pressure sensitive adhesive tape roll is provided with a narrow non-adhesive side edge portion longitudinally along each side edge thereof which extends across the adhesive portion of the pressure sensitive tape roll from the inside edge of one of said non-adhesive side edge portions to the inside edge of the opposite non-adhesive side edge portions so as to define a pair of spaced apart narrow unslit non-adhesive side edge portions which cooperate to maintain the retentive longitudinal continuous integrity of the adhesive tape roll while facilitating the selective detachable removal of the saturated top layer of the tape roll by lifting it away along the slit and tearing it away through the narrow unslit non-adhesive portions to expose the next lowermost unused adhesive tape layer.

U.S. Pat. No. 4,422,201 (McKay), "Lint Remover," in its abstract, describes a lint remover assembly comprising a unitary integrally formed adhesive tape roll sleeve-engaging hollow support cylinder having an open outer end and provided with an elongate integral handle portion extending axially outwardly from one end thereof. An adhesive tape roll sleeve assembly provided for selective axial slidable covering engagement with the hollow support cylinder so as to be selectively rotatable thereon upon moveable contact across a surface being cleaned. A closure plug provided to make friction closure engagement with the open outer end of the hollow support cylinder so as to cooperate therewith to define a storage compartment therein.

Other lint removal devices are described in U.S. Pat. Nos. 6,055,695, 6,127,014, 5,388,300, 4,905,337, and 3,906,578.

Minnesota Mining and Manufacturing Company based in St. Paul, Minn. has sold lint rollers and roller refills in a variety of sizes under the brand name "3M" under part numbers 836, 837, and 833. These lint rollers and roller refills include a tape having a backing with a first side and a second side. The first side of the backing is generally smooth and the second side of the backing has raised portions and recessed portions. The raised portions and recessed portions of the backing are generally parallel to the transverse direction of the tape. A layer of adhesive is coated onto the generally smooth side of the backing, opposite the second side of raised portions and recessed portions. A release layer is coated onto the second side of the backing.

Helmac Products Corporation, based in Flint, Mich. has sold lint adhesive rollers and adhesive roller refills in a variety of sizes under the brand name "Evercare."

Tapes with textured backings are known. For example, U.S. Pat. No. 4,237,889 (Gobran) "Diaper Closure Utilizing Pressure-Sensitive Adhesive Tape Having Textured Foil Backing," in its abstract, describes a pressure-sensitive adhesive tape having a untensilized crystalline isotactic polypropylene or liner high density polyethylene film backing with a pattern of alternating raised portions and recessed portions on one side, which is especially adapted for use as a tab closure for diapers. The raised portions are so disposed that, when a tab is cut from the tape, at least some of the raised portions extend at an angle of 60° or less to the lateral edge of the tab, thereby minimizing any tendency toward inadvertent tearing. In example seven of this patent, the adhesive was applied to the textured face of the film backing of the tape.

Structured adhesives and microstructured adhesives are known. U.S. Pat. No. 6,197,397 B1 describes adhesives having a microreplicated topography. When an adhesion interface is established between the layer of adhesive and a supporting substrate, the topography of the adhesive surface controls the performance of the adhesion interface.

U.S. Pat. No. 5,650,215 provides tapes and other articles having adhesives with microstructured surfaces. The performance properties of the articles can be tailored by independently varying the microstructure and adhesive properties.

Although the commercial success of available lint removal devices has been impressive, it is desirable to further improve the performance of such lint removal devices.

SUMMARY OF THE INVENTION

One aspect of the present invention provides a roll of contaminant removal tape. The roll of contaminant removal tape comprises: a) a backing including a first side and a second side opposite the first side; b) a layer of adhesive on the first side of the backing, where the layer of adhesive is arranged so as to have discontinuous contact with a surface to which the roll is applied; where the roll includes a plurality of wraps of the tape with the layer of adhesive facing outwardly away from the center of the roll of tape. In one preferred embodiment of the above contaminant removal tape, the layer of adhesive includes a first side and a second side opposite the first side, where the first side is a textured surface, and where the textured surface faces outwardly away from the center of the roll of tape. In another preferred embodiment of the above contaminant removal tape, the layer of adhesive includes a plurality of raised portions. In another aspect of this embodiment, the layer of adhesive includes a first side and a second side opposite the first side, where the first side includes the plurality of raised portions and a plurality of recessed portions. In yet another aspect of this embodiment, a portion of the plurality of raised portions and a portion of the plurality of recessed portions are generally parallel to the transverse direction of the tape.

In another preferred embodiment of the above contaminant removal tape, the layer of adhesive is discontinuous. In another preferred embodiment of the above contaminant removal tape, the first side of the backing includes a plurality of raised portions and a plurality of recessed portions. In another aspect of this embodiment, the layer of adhesive is a continuous layer of adhesive coated on the plurality of raised portions and the plurality of recessed portions. In yet another aspect of this embodiment, a portion of the plurality of raised portions and a portion of the plurality of recessed portions are generally parallel to the transverse direction of the tape. In another aspect of this embodiment, the second side of the backing is a generally smooth surface. In another preferred embodiment of the above contaminant removal tape, where the roll further includes a core.

Another aspect of the present invention provides an alternative roll of contaminant removal tape. This roll of contaminant removal tape comprises: a) a backing including a first side and a second side opposite the first side; b) a layer of adhesive on the first side of the backing, where the layer of adhesive includes a discontinuous contact profile; where the roll includes a plurality of wraps of the tape with the layer of adhesive facing outwardly away from the center of the roll of tape.

In another preferred embodiment of the above contaminant removal tape, the layer of adhesive includes a first side and a second side opposite the first side, where the first side is a textured surface, and where the textured surface faces outwardly away from the center of the roll of tape. In another preferred embodiment of the above contaminant removal tape, the layer of adhesive includes a plurality of raised portions. In another aspect of this embodiment, the layer of adhesive includes a first side and a second side opposite the first side, where the first side includes the plurality of raised portions and a plurality of recessed portions. In another aspect of this embodiment, a portion of the plurality of raised portions and a portion of the plurality of recessed portions are generally parallel to the transverse direction of the tape.

In yet another preferred embodiment of the above contaminant removal tape, the layer of adhesive is discontinuous. In another preferred embodiment of the above contaminant removal tape, the first side of the backing includes a plurality of raised portions and a plurality of recessed portions. In another aspect of this embodiment, the layer of adhesive is a continuous layer of adhesive coated on the plurality of raised portions and the plurality of recessed portions. In yet another aspect of this embodiment, a portion of the plurality of raised portions and a portion of the plurality of recessed portions are generally parallel to the transverse direction of the tape. In another aspect of this embodiment, the second side of the backing is a generally smooth surface. In yet another preferred embodiment of the above contaminant removal tape, the roll further includes a core.

Another aspect of the present invention provides a contaminant removal tape assembly. The contaminant removal tape assembly comprises: a) an applicator, comprising: i) a handle having a first end and a second end opposite the first end; and ii) a tape-receiving portion connected to the second end of the handle; and b) a roll of contaminant removal tape mounted on the tape-receiving portion, where the roll of contaminant removal tape comprises: i) a backing including a first side and a second side opposite the first side; ii) a layer of adhesive on the first side of the backing, where the layer of adhesive is arranged so as to have discontinuous contact with a surface to which the roll is applied; where the roll includes a plurality of wraps of the tape with the layer of adhesive facing outwardly away from the center of the roll of tape.

In one preferred embodiment of the above contaminant removal tape assembly, the layer of adhesive includes a plurality of raised portions. In another aspect of this embodiment, the layer of adhesive includes a first side and a second side opposite the first side, where the first side includes the plurality of raised portions and a plurality of recessed portions. In yet another aspect of this embodiment, a portion of the plurality of raised portions and a portion of the plurality of recessed portions are generally parallel to the transverse direction of the tape.

In another preferred embodiment of the above contaminant removal tape assembly, the layer of adhesive is discontinuous. In another preferred embodiment of the above contaminant removal tape assembly, the first side of the backing includes a plurality of raised portions and a plurality of recessed portions. In another aspect of this embodiment, the layer of adhesive is a continuous layer of adhesive coated on the plurality of raised portions and the plurality of recessed portions. In yet another aspect of this embodiment, a portion of the plurality of raised portions and a portion of the plurality of recessed portions are generally parallel to the transverse direction of the tape. In another aspect of this embodiment, the second side of the backing is a generally smooth surface.

In another preferred embodiment of the above contaminant removal tape assembly, the roll further includes a core.

In yet another preferred embodiment of the above contaminant removal tape assembly, the tape-receiving portion further comprises a cylindrical surface. In another preferred embodiment of the above contaminant removal tape assembly, the handle further comprises a first flange, where the tape-receiving portion further comprises a first axle, and where the first axle of the tape-receiving portion is attached to the first flange of the handle. In another aspect of this embodiment, the handle further a second flange, where the tape-receiving portion further comprises a second axle, and where the second axle of the tape-receiving portion is attached to the second flange of the handle. In another preferred embodiment of the above contaminant removal tape assembly, the roll of contaminant removal tape is removeably mounted on the tape-receiving portion.

Another aspect of the present invention provides an alternative contaminant removal tape assembly. This contaminant removal tape assembly comprises: a) an applicator, comprising: i) a handle having a first end and a second end opposite the first end; and ii) a tape-receiving portion connected to the second end of the handle; and b) a roll of contaminant removal tape mounted on the tape-receiving portion, where the roll of contaminant removal tape comprises: i) a backing including a first side and a second side opposite the first side; ii) a layer of adhesive on the first side of the backing, where the layer of adhesive includes a discontinuous contact profile; where the roll includes a plurality of wraps of the tape with the layer of adhesive facing outwardly away from the center of the roll of tape.

In one preferred embodiment of the above contaminant removal tape assembly, the layer of adhesive includes a plurality of raised portions. In another aspect of this embodiment, the layer of adhesive includes a first side and a second side opposite the first side, where the first side includes a plurality of raised portions and a plurality of recessed portions. In another aspect of this embodiment, a portion of the plurality of raised portions and a portion of the plurality of recessed portions are generally parallel to the transverse direction of the tape.

In another preferred embodiment of the above contaminant removal tape assembly, the first side of the backing includes a plurality of raised portions and a plurality of recessed portions. In another aspect of this embodiment, the layer of adhesive is a continuous layer of adhesive coated on the plurality of raised portions and the plurality of recessed portions. In another aspect of this embodiment, a portion of the plurality of raised portions and a portion of the plurality of recessed portions are generally parallel to the transverse direction of the tape. In yet another aspect of this embodiment, the second side of the backing is a generally smooth surface.

In another preferred embodiment of the above contaminant removal tape assembly, the roll further includes a core. In another preferred embodiment of the above contaminant removal tape assembly, the tape-receiving portion further comprises a cylindrical surface. In yet another preferred embodiment of the above contaminant removal tape assembly, the handle further comprises a first flange, where the tape-receiving portion further comprises a first axle, and where the first axle of the tape-receiving portion is attached to the first flange of the handle. In another aspect of this embodiment, the handle further a second flange, where the tape-receiving portion further comprises a second axle, and where the second axle of the tape-receiving portion is attached to the second flange of the handle. In another preferred embodiment of the above contaminant removal tape assembly, the roll of contaminant removal tape is removeably mounted on the tape-receiving portion.

Yet another aspect of the present invention provides a method of removing contaminants from a surface. The method of removing contaminants from a surface, comprises the steps of: a) providing a contaminant removal tape assembly, where the contaminant removal tape assembly comprises: i) an applicator, where the applicator comprises: a handle having a first end and a second end opposite the first end; and a tape-receiving portion connected to the second end of the handle; and ii) a roll of contaminant removal tape mounted on the tape-receiving portion, where the roll of contaminant removal tape comprises: a backing including a first side and a second side opposite the first side; a layer of adhesive on the first side of the backing, where the layer of adhesive is arranged so as to have discontinuous contact with a surface to which the roll is applied; where the roll includes a plurality of wraps of the tape with the layer of adhesive facing outwardly away from the center of the roll of tape; and b) rolling decontaminant removal tape assembly along a surface such that the layer of adhesive discontinuously contacts the surface and the contaminants adhere to the layer of adhesive. In one preferred embodiment of the above method, the layer of adhesive of one wrap of tape of the roll adheres greater to the backing of an adjacent wrap of the roll than the layer adhesive adheres to the surface.

Another aspect of the present invention provides an alternative method of removing contaminants from a surface. The method of removing contaminants from a surface comprises the steps of: a) providing a contaminant removal tape assembly, where the contaminant removal tape assembly comprises: i) an applicator, where the applicator comprises: a handle having a first end and a second end opposite the first end; and a tape-receiving portion connected to the second end of the handle; and ii) a roll of contaminant removal tape mounted on the tape-receiving portion, where the roll of contaminant removal tape comprises: a backing including a first side and a second side opposite the first side; a layer of adhesive on the first side of the backing, where the layer of adhesive includes a discontinuous contact profile; where the roll includes a plurality of wraps of the tape with the layer of adhesive facing outwardly away from the center of the roll of tape; and b) rolling decontaminant removal tape assembly along a surface such that the layer of adhesive discontinuously contacts the surface and the contaminants adhere to the layer of adhesive. In one preferred embodiment of the above method, the layer of adhesive of one wrap of tape of the roll adheres greater to the backing of an adjacent wrap of the roll than the layer adhesive adheres to the surface.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The present invention provides a contaminant removal assembly that includes a roll of contaminant removal tape. The roll of contaminant removal tape is wrapped such that the layer of adhesive is facing outwards, away from the center of the roll. This layer of adhesive discontinuously contacts the surface to which the roll is applied, in the area where the roll and the surface meet or touch. By discontinuous contact, it is meant that when the adhesive layer on the roll is rolled along a surface, not all of the adhesive contacts the surface. In other words, only some portions of the outermost surface of the roll of contaminant removal tape contact the surface, while other portions of do not. In preferred embodiments, this discontinuous contact is achieved by providing an adhesive layer that is textured or structured or has a discontinuous contact profile, for example as illustrated in FIGS. 3–7. Because the entire outermost surface of the roll closest to the surface to be cleaned is not completely in contact with the surface, it requires less force to later remove the tape from the surface, taking with it any contaminants that may be on the surface. This is especially beneficial to help reduce the problem of the tape unwinding and adhering to the surface to be cleaned, as it is rolled along the surface, which sometimes happens with prior art lint removal devices in certain circumstances. This problem will occur when a tape roll is rolled along a substantially flat surface to be cleaned, such as a counter or wall, in the direction of the wind-up of the tape. The tape preferentially adheres to the surface rather than to itself in the roll, and therefore the tape unwinds from the roll on the roller and lays adhered along the surface to be cleaned. This will typically occur where the adhesion force between the layer of adhesive on the roll and the surface is greater than the force necessary to unwind the roll of tape. The present invention helps reduce this problem, by either one or both of increasing the unwind force of the roll of tape (the force required to unwind the roll of tape) and decreasing the initial tack and adhesion to the surface to be cleaned, as illustrated in examples found at the end of the Detailed Description.

The contaminant removal assembly of the present invention is designed to pick up contaminants, such as lint, hair, threads, dirt or any other matter from a surface, such as floors, ceilings, work surfaces, or clothing, to clean the surface.

The contaminant removal assembly of the present invention, including its roll of contaminant removal tape, is especially usefully for cleaning smooth, stainless steel surfaces, such as those found in manufacturing areas, for example semiconductor clean room manufacturing areas, or in other industrial areas.

Figure 1:
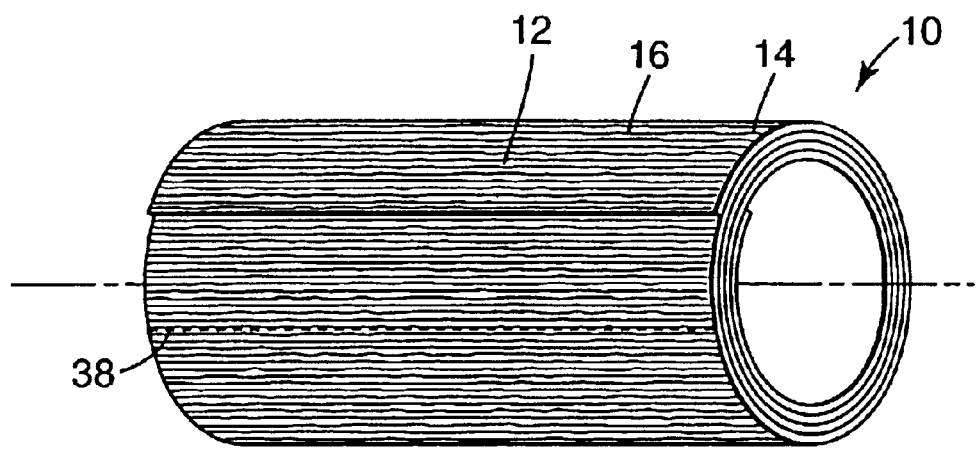
FIG. 1 is a perspective view of one embodiment of the roll of contaminant removal tape of the present invention.

FIG. 1 illustrates one embodiment of the roll 10 of contaminant removal tape 12 of the present invention. The contaminant removal tape 12 includes a backing 14 and a layer of adhesive 16 on one side of the backing 14. The roll 10 includes a plurality of wraps of the contaminant removal tape 12 about the center axis of the roll 10. The layer of adhesive 16 of the tape 12 faces outwards, away from the center of the roll 10. The non-adhesive side of the backing 14 of the tape 12 faces inwards, towards the center of the roll 10. The contaminant removal tape 12 is formed into a roll 10 having a plurality of wraps with the adhesive layer 16 facing outwardly by rolling the tape onto itself.

The roll 10 of contaminant removal tape 12 is not illustrated as including a core or any support material. However, roll 10 may optionally include a core, where the multiple wraps of contaminant removal tape 12 would be wound about the core. Roll 10 may include an optional liner interposed between multiple wraps of tape 12.

Figure 2:
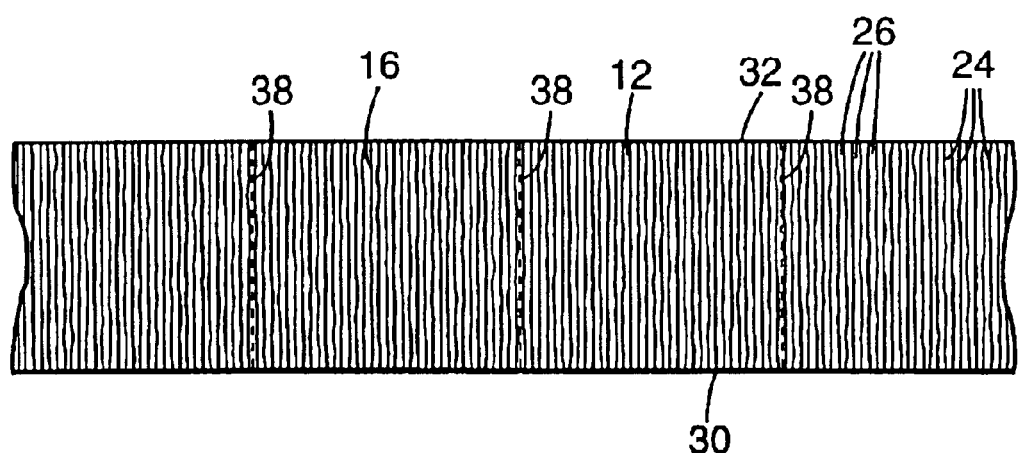
FIG. 2 is a top view of a portion of the contaminant removal tape from the roll of FIG. 1, with the tape unrolled.

FIG. 2 illustrates a portion of the contaminant removal tape 12 from the roll 10 of FIG. 1, with the tape unrolled. The contaminant removal tape 12 is illustrated as having the layer of adhesive 16 coated across the entire width of the contaminant removal tape 12. Alternatively, the tape 12 may include one or any number of non-adhesive zones (not illustrated). These non-adhesive zones would help the user separate the outer wrap of tape 12 from the roll 10. A first non-adhesive zone could run along the first edge 30 of the length of the contaminant removal tape 12. A second non-adhesive zone could run along the second edge 32 of the length of the contaminant removal tape 12, opposite the first non-adhesive zone. Both non-adhesive zones could run along the length of the contaminant removal tape 12 opposite each other with the layer of adhesive 16 located in between. The non-adhesive zones could be first adhesive coated, along with the rest of the tape, and then detackified by using waxes, lacquers, or inks, for example. Alternatively, the first and second non-adhesive zones could be left uncoated by adhesive.

The contaminant removal tape 12 is illustrated as including optional perforations 38 to facilitate removing the outer wrap of contaminant removal tape 12 from the roll 10 after that wrap of tape has been used and is to be discarded. The perforations 38 can be made before the contaminant removal tape 12 is rolled into a roll 10 or after the roll has been formed. Also, the perforations 38 on successive wraps can be located at the same or different circumferential locations on the roll 10. Alternatively, the roll 10 may include perforations 38 that progressively increase in length relative to adjacent lengths, such as those describe in U.S. Pat. No. 5,763,038 (Wood), "Progressively Perforated Tape Roll," which is hereby incorporated by reference. Alternatively, after the tape 12 is formed into a roll 10, a complete cut (not shown) can be formed through the roll to create discrete sheets and to facilitate removal of the outer wrap of tape. The complete cut could extend across the roll 10, except for the edges, or across the entire roll 10, except for the innermost wraps closest to the center axis of the roll 10.

The contaminant removal tape 12 is illustrated as having a plurality of raised portions 24 of adhesive and a plurality of recessed portions 26 of adhesive to provide a textured surface of adhesive. This textured surface of adhesive is one way to provide discontinuous contact with a surface to which the roll 10 is applied, as described in more detail with regard to FIG. 7. Preferably, the raised portions 24 and recessed portions 26 of adhesive are generally parallel to the transverse direction of the contaminant removal tape 12. In other words, the raised portions 24 and recessed portions 26 of adhesive are generally perpendicular to the edges 30, 32 of the tape 12. However, the raised portions and recessed portions of adhesive may extend in any direction.

Figure 3:
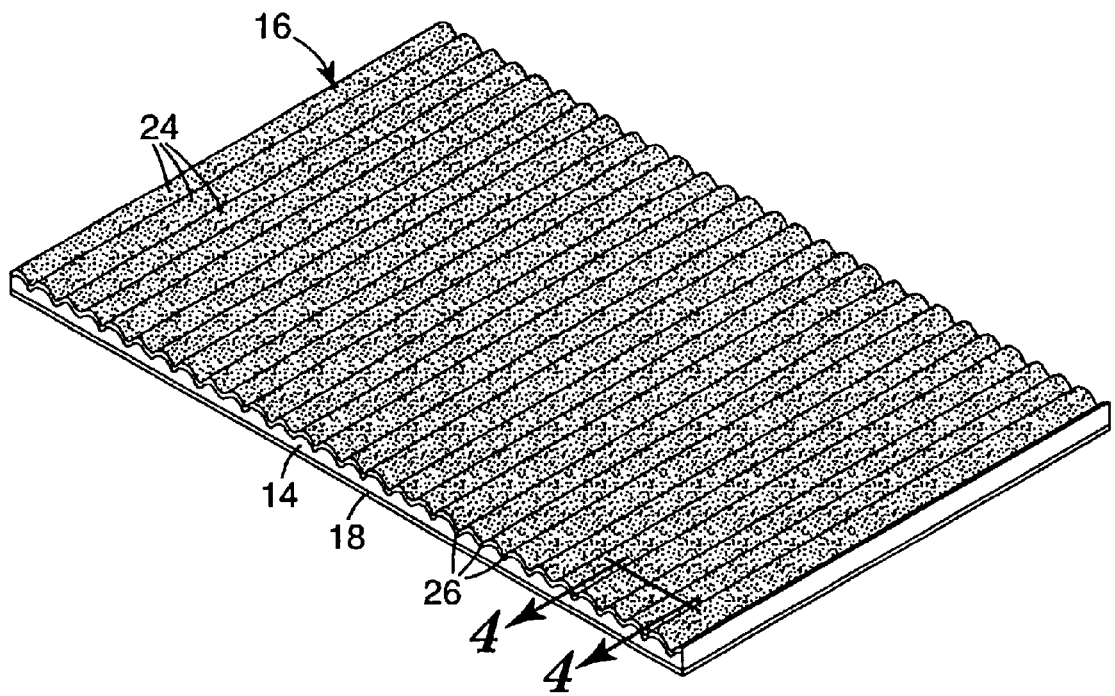
FIG. 3 is an enlarged perspective view of the portion of the contaminant removal tape of FIG. 2.

FIG. 3 is an enlarged perspective view of the portion of the contaminant removal tape 12 of FIG. 2, which is useful for describing the textured surface of the layer of adhesive 16. Preferably, the textured surface includes raised portions 24 and recessed portions 26 of adhesive in the layer of adhesive 16. The raised portions 24 of adhesive are interposed between the recessed portions 26. Preferably, the raised portions 24 and recessed portions 26 of adhesive are generally parallel to the transverse direction of the contaminant removal tape 12. It is not essential that all the raised portions 24 of adhesive be at the same height or that all the recessed portions 26 of adhesive be at the same depth.

Figure 4A:
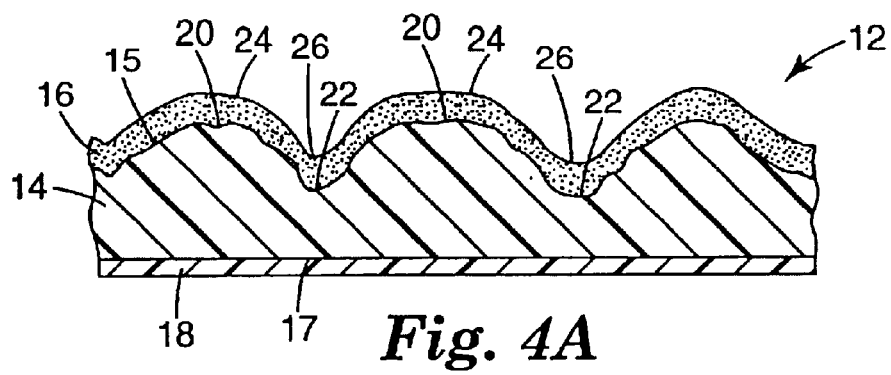
FIG. 4A is a further enlarged cross-sectional view of the contaminant removal tape of FIG. 3 taken along section line 4—4.

FIG. 4 is a further enlarged cross-sectional view of the contaminant removal tape of FIG. 3 taken along section line 4—4. The backing 14 of the contaminant removal tape 12 includes a first side 15 and a second side 17 opposite the first side 15. Preferably, the first side 15 of the backing includes a plurality of raised portions 20 and recessed portions 22. The raised portions 20 could also be described as ridges 20 and the recessed portions 22 could also be described as valleys 22. Preferably, the second side 17 is generally smooth and more preferably, is substantially smooth. However, the second side 17 is not required to be generally smooth. Preferably, the layer of adhesive 16 is coated on the first side 15 of the backing over the raised portions 20 and recessed portions 22 of the backing to provide a textured layer of adhesive, which also has a plurality of raised portions 24 and recessed portions 26. The raised portions 24 and recessed portions 26 of adhesive correspond generally to the raised portions 20 and recessed portions 22 of the backing.

There are other ways to provide a layer of adhesive with raised portions 24 and recessed portions 26 than describe above. For instance, the backing 14 of the contaminant removal tape 12 could include a first side 15 and second side 17 that are both generally smooth and the layer of adhesive itself could include raised portions 24 and recessed portions 26. An example of such an adhesive is taught in U.S. Pat. No. 6,197,397 B1, (Sher et al.) "Adhesives Having a Microreplicated Topography and Methods of Making and Using Same," which is hereby incorporated by reference, and which describes adhesives having a microreplicated topography. As another example U.S. Pat. No. 5,650,215 (Mazurek et al.), "Pressure-Sensitive Adhesives Having Microstructured Surfaces," shich is hereby incorporated by reference, and which describes tapes and other articles having adhesives with microstructured surfaces.

Figure 4B:
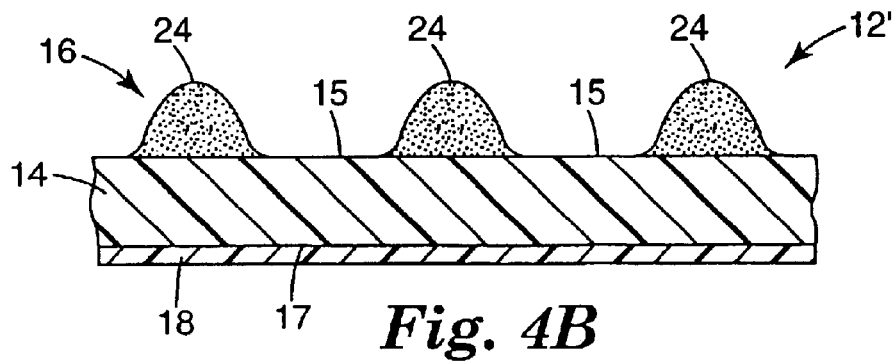
FIG. 4B is an enlarged cross-sectional view of an alternative contaminant removal tape.

FIG. 4B illustrates an alternative contaminant removal tape 12'. In this embodiment, the tape 12' includes a plurality of discrete raised portions 24 of adhesive, as its layer of adhesive 16, along the first side of the backing 14. The tape 12' includes no adhesive between adjacent raised portions 24. With this embodiment of contaminant removal tape 12', discontinuous contact is meant that some or all of the raised portions of adhesive 24 contact the surface and where there is no adhesive between the raised portions of adhesive 24, there are areas of no contact with the surface.

The contaminant removal tape 12 may optionally include a release coating 18. The release coating 18 is formed on the second side 17 of the backing 14 to facilitate removing the outer wrap of tape from the roll 10 after that wrap of tape has been used and is to be discarded. Numerous other layers can be added to the tape, such as primers, to increase the adhesion of adhesive layer 16 to backing 14. Also, printed material can be located on the first side of the backing layer under the adhesive. This printed material can be advertising, instructions, or other information. Also, the tape could contain deodorants, perfumes, antistatic materials, and encapsulated cleaning chemicals. Also, the backing 14 can be modified such as by flame treatment, corona treatment, and roughening.

Figure 5:
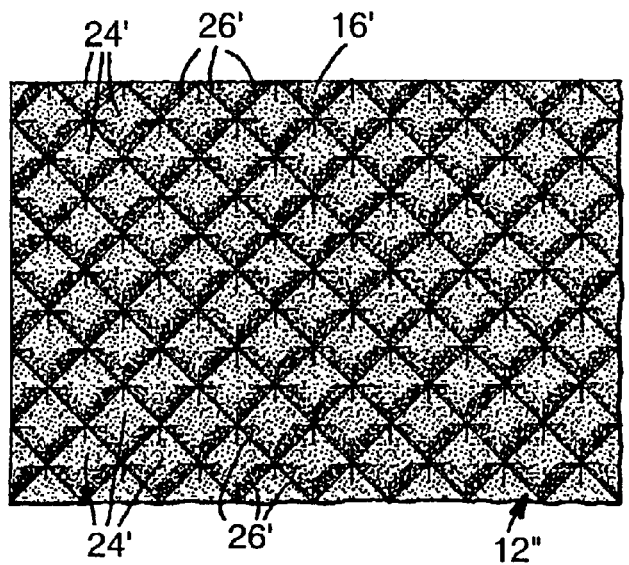
FIG. 5 is an enlarged top view of a portion of alternative embodiment of the contaminant removal tape.

FIG. 5 is an enlarged top view of a portion of another alternative embodiment of the contaminant removal tape 12". In contaminant removal tape 12", the layer of adhesive 16' includes raised portions 24' and interposed recessed portions 26'.

Figure 6:
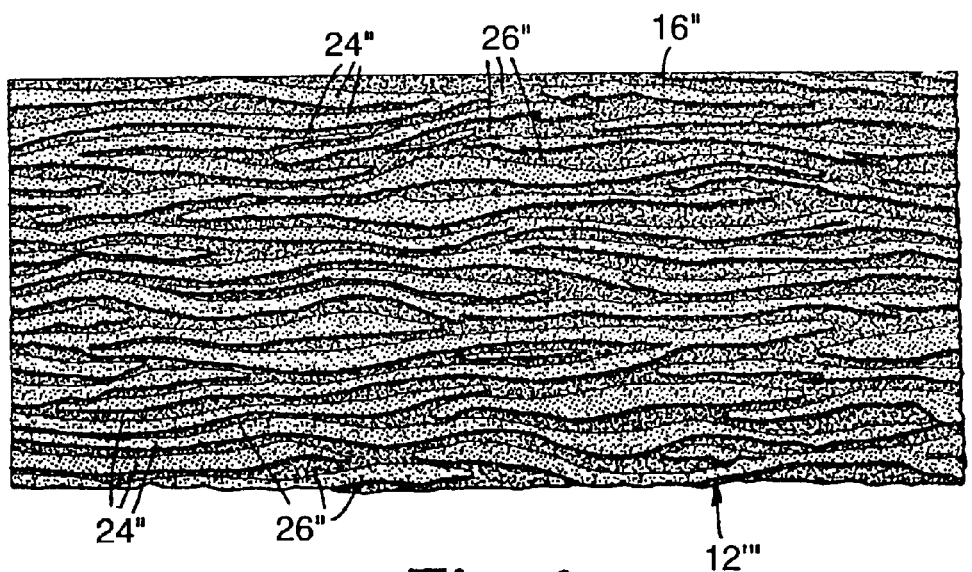
FIG. 6 is an enlarged top view of a portion of yet another alternative embodiment of the contaminant removal tape.

FIG. 6 is an enlarged top view of a portion of yet another alternative embodiment of the contaminant removal tape 12'''. In contaminant removal tape 12''', the layer of adhesive 16" includes raised portions 24" and interposed recessed portions 26".

Other embodiments of a textured adhesive layer 16 are contemplated. For example, the adhesive may be discontinuous or interrupted. That is, there may be portions of the backing that remain uncoated. This could be in any desired pattern that includes enough adhesive contact to achieve the desired level of contaminant removal, while leaving enough area uncoated to achieve a desired level of release force from the surface to be cleaned. The adhesive portions may be interconnected about the uncoated portions or there may be discrete, unconnected portions of adhesive. For example the adhesive may be dot-coated or strip-coated onto the backing 14 to provide portions of adhesive in some areas and not in other areas. In any of these embodiments, the layer of adhesive would be arranged so as to have discontinuous contact with a surface to which it is applied.

Figure 7:
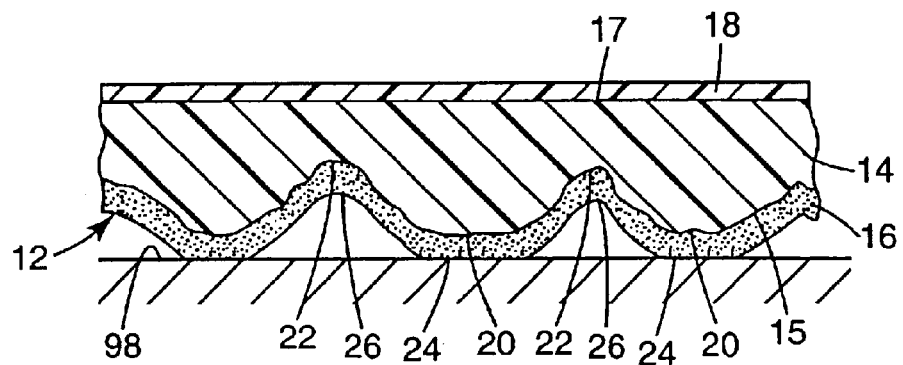
FIG. 7 is a partial cross-sectional view of the contaminant removal roll of tape of FIG. 1 in contact with a surface.

FIG. 7 illustrates the contaminant removal tape roll 10 rolled along a surface 98. As the contaminant removal tape roll 10 is rolled along the surface, only the raised portions 24 of the adhesive layer 16 contact the surface 98, taking with it any contaminants that may be on the surface. The recessed portions 26 of the adhesive layer 16 do not contact the surface. In other words, the raised portions 24 and recessed portions 26 form a discontinuous profile in the layer of adhesive 16. As the layer of adhesive 16 is rolled along the surface, it has discontinuous contact with the surface 98. In this embodiment, discontinuous contact is meant that when the adhesive layer on the roll is rolled along a surface, not all of the layer of adhesive contacts the surface in the area where the adhesive and surface 98 meet. In other words, only some portions of the adhesive contact the surface, while other portions of the adhesive do not.

Because of the discontinuous contact between the layer of adhesive 16 and the surface, the tape roll 10 has less adhesion to the surface in comparison to a prior art lint remover roller that have adhesive coated across a generally smooth backing surface. In these prior art lint rollers, all of the layer of adhesive contacts the surface 98 as it rolls across the surface. Because the present invention has less adhesion to the surface along which it rolls, this reduces the problem of the tape unwinding and adhering to the surface as the roll runs across the surface, as discussed at the beginning of the Detailed Description. In addition, the present invention can provide, if desired, an increased unwind force, which is the force required to unwind the roll of tape 10, in comparison to an equivalent roll that has the same adhesive and release layer, except that the adhesive is coated on the smooth surface and the release layer is coated on the structure surface as illustrated in the examples.

Figure 8:
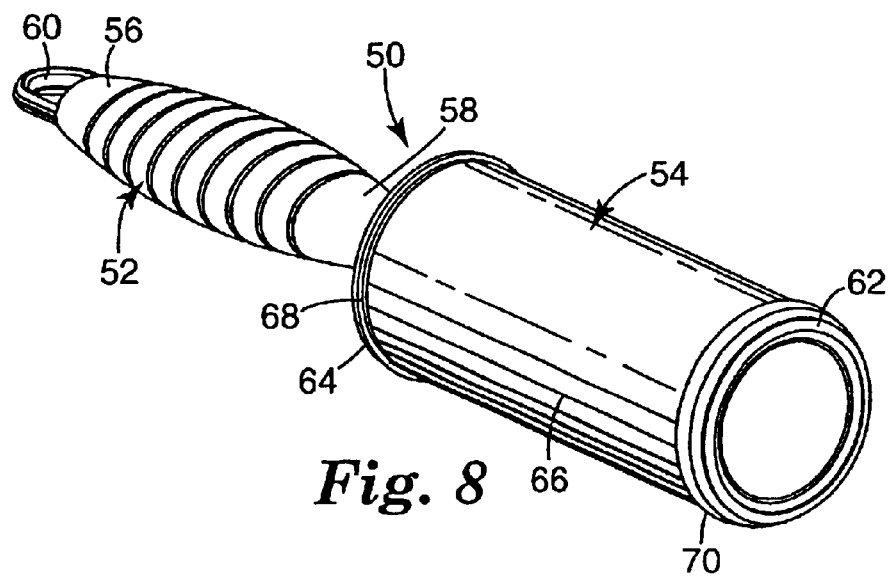
FIG. 8 is a perspective view of one embodiment of the applicator of the present invention.
Figure 9:
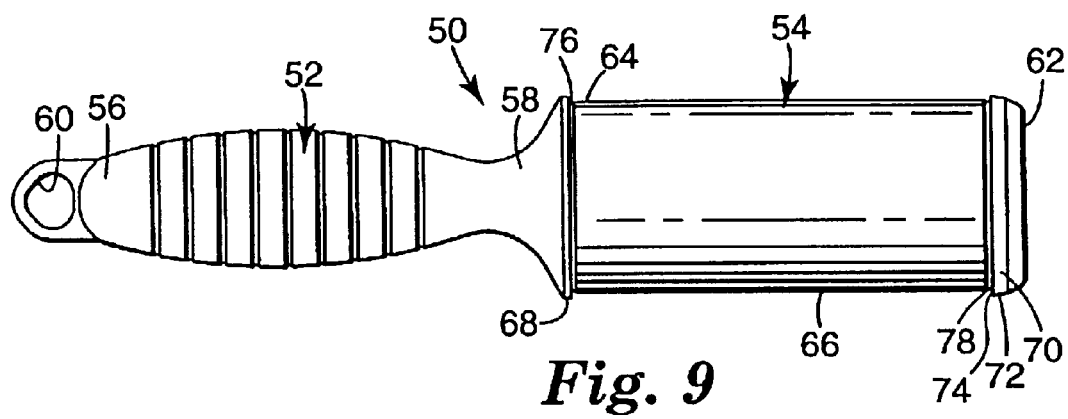
FIG. 9 is a side view of the applicator of FIG. 8.
Figure 10:
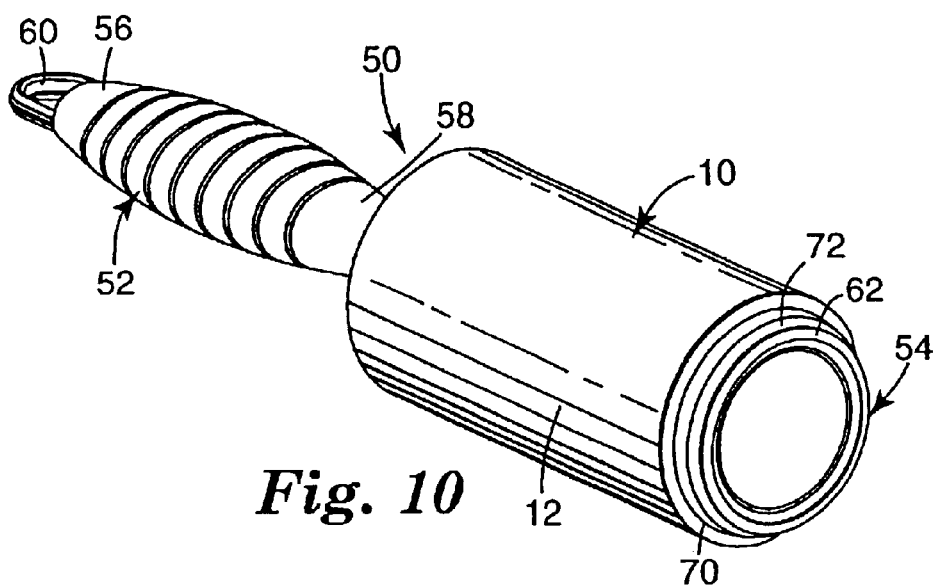
FIG. 10 is a perspective view of the roll of contaminant removal tape of FIG. 1 mounted on the applicator of FIG. 8 to provide one embodiment of the contaminant removal assembly of the present invention.

FIGS. 8 and 9 illustrate one embodiment of the applicator 50 of the present invention. Any suitable applicator may be used, and the present invention is not limited to use the illustrated applicators. The applicator 50 includes the handle portion 52 and the tape-receiving portion 54. The roll 10 of contaminant removal tape 12 can be used by sliding the roll 10 onto the tape-receiving portion 54 of the applicator 50. FIG. 10 illustrates the roll 10 of contaminant removal tape 12 on the applicator 50 to provide a contaminant removal tape assembly.

The handle portion 52 can have any shape and can be contoured to ergonomically fit a hand. The handle portion 52 has a free end 56 and a connecting end 58. The free end 56 can have an opening 60 to permit hanging the applicator 50 on a hook for storage.

The tape-receiving portion 54 also includes a free end 62 and a connecting end 64. The connecting end 58 of the handle portion 52 is connected to the connecting end 64 of the tape-receiving portion 54. The tape-receiving portion 54 also includes a cylindrical tape-receiving surface 66, which extends between the free end 62 and the connecting end 64. The tape-receiving surface 66 extends for the entire width of a tape roll 10 and provides support along substantially the entire surface of the tape roll. Preferably, there are no openings, gaps, or notches on which a tape roll could catch or snag to damage the roll. However, the tape-receiving surface 66 need not be cylindrical. It could be formed of planar or curved sides meeting in edges that assist in holding the tape roll 10 in position.

An inner lip 68 is adjacent the connecting end 64, and an outer lip 70 adjacent the free end 62 on the tape-receiving portion 54. Both lips 68, 70 extend radially beyond the tape-receiving surface 66.

The outer lip 70 has a tapered portion 72 on the side facing the free end 62 of the tape-receiving portion 54. The taper is in a direction in which the diameter increases from the free end toward the connecting end. This facilitates applying a roll on the applicator. The tapered portion can be at an angle of from 5° to 15° to a line parallel to the tape-receiving surface 66. This taper permits a tape roll 10 to be applied over the outer lip 70 without damaging the inner wraps of tape and ruining the tape roll.

The outer lip 70 can be perpendicular to the tape-receiving portion 54 on the side 74 facing the handle portion 52. After a tape roll 10 traverses over the outer lip 70, it is in place on the tape-receiving surface 66.

If the tape roll 10 is coreless and is stretchable, it can be stretched over the slightly oversized and tapered outer lip 70, which can optionally be compressible and flexible. In one embodiment of the invention, maximum diameter of the outer lip is more than 5% bigger than the diameter of the tape-receiving portion; the inner diameter of the tape roll 10 is bigger than the diameter of the tape-receiving portion 54 (which must not be too big to permit the tape roll 10 to rotate) and smaller than the maximum diameter of the outer lip 70. Once the roll 10 is in place, the tape recovers to its original size and resides in the recessed area of the tape-receiving surface 66 (between the inner lip 68 and the outer lip 70) which is slightly oversized to allow seating of the roll 10 of tape 12.

The inner and outer lips have grooves 76, 78 in the tape-receiving surface 66 to hold the tape roll 10 in place, so that the tape roll 10 cannot be removed except by dispensing the total roll, that is all of the sheets of a coreless roll (or compressing the outer lip 70). The grooves 76, 78 extend completely around the tape-receiving surface 66 and prevent the tape roll 10 from bending upward over the respective inner and outer lips 68, 70. The grooves cause the tape roll 10 to bend into the groove when forced toward the lips 68, 70 and retains the tape 12 in proper alignment on the tape-receiving surface 66. Typically, up to eight layers of tape would be retained by the grooves 76, 78.

Figure 11:
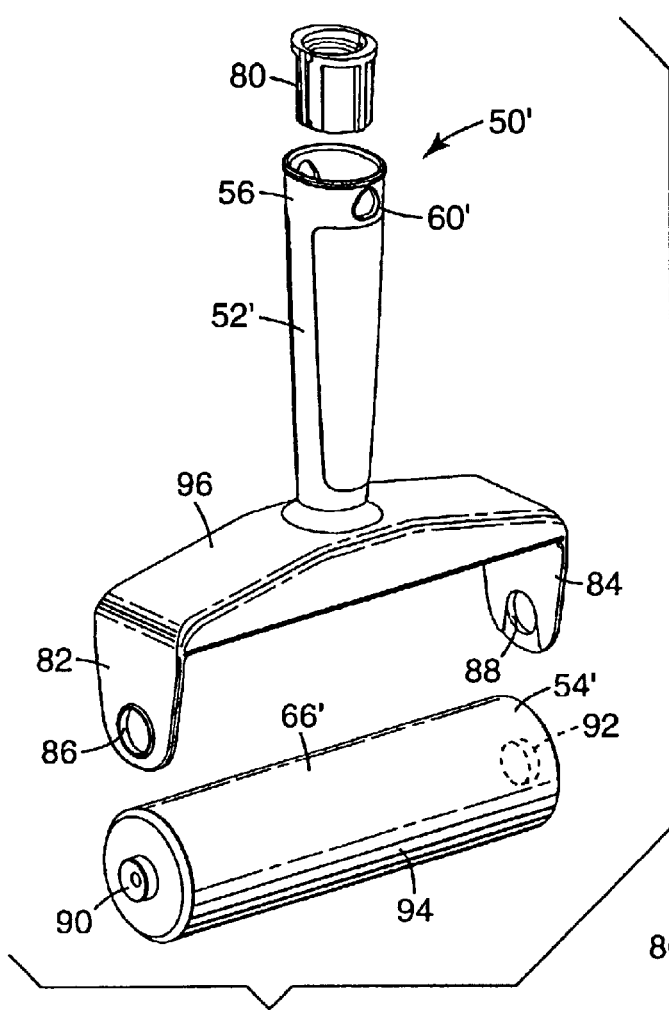
FIG. 11 is an exploded view of an alternative embodiment of the applicator.
Figure 12:
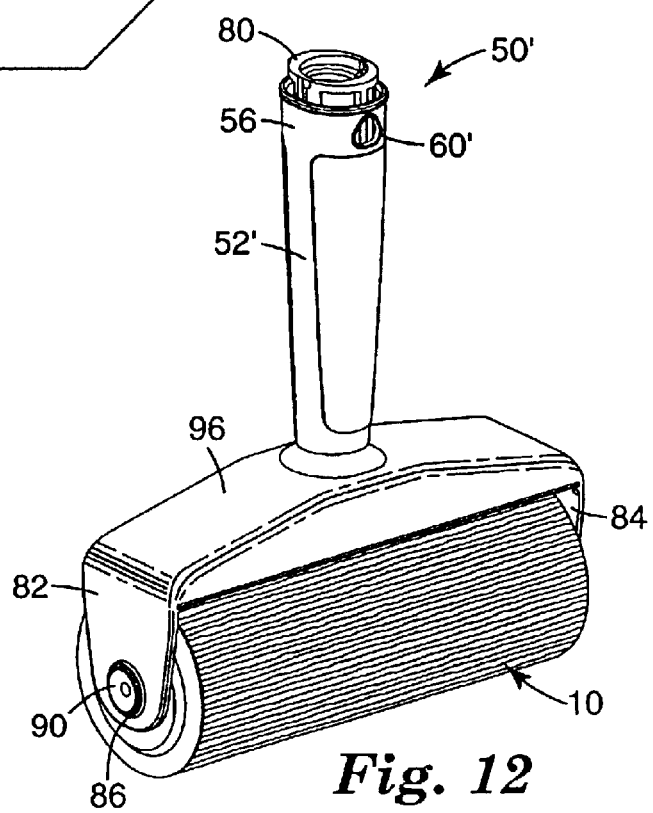
FIG. 12 is a perspective view of the roll of contaminant removal tape of FIG. 1 mounted on the applicator of FIG. 11 to provide an alternative embodiment of the contaminant removal assembly of the present invention.

FIGS. 11 and 12 illustrate an alternative embodiment of the applicator. FIG. 12 illustrates one embodiment of the contaminant removal tape assembly. Applicator 50' also includes a handle portion 52' and a tape-receiving portion 54'. The handle portion 52' can have any shape and can be contoured to ergonomically fit a hand. The handle portion 52' has a free end 56'. The free end 56' of the handle portion 52' is preferably hollow and includes an opening 60' to permit hanging the applicator 50' on a hook for storage. The applicator 50' may optionally include an insert 80 for the free end 56' of the handle portion. This insert 80 may be used to mount the applicator 50' onto a longer handle (not shown.) The handle portion 52' also includes a bridge 96 opposite the free end 56'. The bridge 96 includes a first flange 82 and a second flange extending from opposite ends of the bridge 96. Each flange contains a hole 86, 88 for receiving the axles 90, 92 of the tape-receiving portion 54'.

The tape-receiving portion 54' includes a roller 94, a first axle 90, and second axle 92. The first axle 90 and second axle 92 are mounted on opposite ends of the roller 94 and are preferably symmetrically mounted on the opposite ends of the roller 94. The roller 94 includes a cylindrical tape-receiving surface 66' that extends between the first axle 90 and second axle 92. The tape-receiving surface 66' provides support along substantially the entire surface of the tape roll. Preferably, there are no openings, gaps, or notches on the tape-receiving surface 66' which a tape roll 10 could catch or snag to damage the roll. However, the tape-receiving surface 66' need not be cylindrical. It could be formed of planar or curved sides meeting in edges that assist in holding the tape roll in position.

To mount a new contaminant removal tape roll 10 on the applicator 50', the flanges 82, 84 are spread apart to remove the roller 94 from the applicator. A new tape roll 10 is then slid onto the roller 94. Next, the tape roll 10 and roller 94 are inserted between the flanges 82, 84 of the handle 52' and the axles 90, 92 are located in holes 86, 88. The roll 10 and roller 94 may then rotate freely about the center of the roller 94, with the axles 90, 92 turning in holes 86, 88.

Any suitable applicators may be used with the contaminant removal tape roll 10. One such example, U.S. Pat. No. 4,399,579 (McKay), "Lint Remover," discusses an applicator having a handle portion and a hollow tape-receiving portion. As another example, U.S. Pat. No. 4,422,201 (McKay) "Lint Remover," discusses an applicator having a handle portion and a hollow tape-receiving portion. As yet another example, U.S. Pat. No. 6,055,695, "Lint Roller Assembly," discusses an applicator having a handle section and a lint roller support section. Alternatively, the contaminant removal roll 10 could be used on an applicator having a tape-receiving surface and a cap or plug mounted on the end of the tape-receiving surface to keep the roll 10 in place. In this embodiment, the cap or plug would first be removed to allow a user to put a new roll 10 on the tape-receiving surface.

The applicators 50, 50' may be made by blow molding, injection molding, or other manufacturing methods known by those skilled in the art.

The applicators 50, 50' could be used with a tape roll having a core. However, the core would remain on the tape-receiving portion 54 after the tape 12 is completely dispensed. The applicator would consequently not be reusable unless the core was cut off or removed.

When forming a roll 10, the tape 12 is preferably sufficiently firm, stiff, and self-supporting to obviate the need for support material, such as a core. The entire roll 10, including the last wrap, is preferably completely usable for its intended purpose of contaminant removal without wasting any tape. The last wrap of tape directly contacts the tape-receiving portions 54, 54' of the applicators 50, 50' such that the last wrap of tape is completely useable. When the last wrap of tape is removed, the applicators 50, 50' can be replenished with another roll 10 of tape.

Examples of the suitable backings include paper, polymeric and plastic film materials including polyolefins such as polyethylene, polypropylene, copolymers of ethylene or propylene, halogenated polymers such as poly(vinyl chloride) and poly(vinylidene chloride), polyesters such as polyethylene terephthalate, polyurethanes, and poly(vinyl acetate) and vinyl acetate copolymers. Polypropylenes can include monoaxially oriented polypropylene, biaxially oriented polypropylene, simultaneously biaxially oriented polypropylene, and untensilized polypropylene including untensilized isotactic polypropylene. Various types of nonwoven synthetic polymeric backings including spun-bound polyethylene could be used. The backing material can be compostible or degradable, can be colored, can be printed, and can be of different surface textures or embossed.

Suitable adhesives for the layer of adhesive 16 include hot melt-coated formulations, transfer-coated formulations, solvent-coated formulations, and latex formulations.

The contaminant adhesive tape 12 includes at least one layer of adhesive 12. Preferably, the layer of adhesive is a pressure-sensitive adhesive. General categories of pressure-sensitive adhesives can be based on natural rubber, styrene butadiene, butyl rubber and polyisobutylene, styrenic block copolymers, ethylene-vinyl acetate and related copolymers, poly-alpha olefins, acrylic adhesives, silicone, butadiene-acrylonitrile, polychloroprene, polybutadiene, atactic polypropylene, or repulpable pressure-sensitive adhesive. (From the *Handbook of Pressure Sensitive Adhesive Technology*, Third Edition, Edited by Donatas Satas, Satas & Associates, 1999.) However, other pressure-sensitive adhesives may be used for adhesive layer of the adhesive article, such as those with the properties described in *Adhesion and Adhesives Technology an Introduction*, p. 216, Alphonsus V. Pocius, Hanser Gardner Publications, Inc., 1997. The Pressure-Sensitive Tape Council has defined pressure-sensitive adhesives as materials with the following properties: 1) aggressive and permanent tack; 2) adheres with no more than finger pressure; 3) requires no activation by any energy source; 4) has sufficient ability to hold onto the adherend; and 5) has enough cohesive strength to be able to be removed cleanly from the adherend.

Examples of adhesives useful in for the layer of adhesive 16 include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

The layer of adhesive and release layer may be coated on the backing by any method known in the art, such as by gravure coating, vacuum coating, rotary rod coating, drop die coating, slot die coating, curtain coating, meyer rod coating, knife coating, coating by a nip, or extrusion coating.

To manufacture one embodiment of the contaminant removal tape roll 10, a master roll of 10 cm (4 in) wide tape was first made. The master roll of tape had polypropylene backing 14 with the first side 15 of the backing 14 having raised portions 20 and recessed portions 22 and the second side 17 of the backing 14 having a generally smooth surface relative to the first side 15. A release coating was coated on the second side 17 of the backing 14, as is known by those skilled in the art. A hot melt coated adhesive was coated across the raised portions 20 and recessed portions 22 of the first side 15 of the backing 14, leaving uncoated edges or adhesive free zones of approximately 0.62 cm (0.25 in) wide along the length of the tape 12. The master roll was then formed and wound in a conventional manner, with the adhesive side facing in. The master roll was then rewound, with the adhesive coated side out. A vacuum pulled the tape onto a mandrel during this stage and held it in place while the appropriate length of tape was wound with the adhesive coated side out and converted to a coreless roll of the proper length. A turret indexed the finished wound tape. As the turret rotated, the vacuum on the original mandrel was discontinued to allow the coreless roll 10 of tape 12 to be removed. A second mandrel moved into place, the vacuum connected, and the process was repeated. Additional mandrels could be used, as necessary, to facilitate continuous operation.

The operation of the present invention will be further described with regard to the following detailed examples. These examples are offered to further illustrate the various specific and preferred embodiments and techniques. It should be understood, however, that many variations and modifications might be made while remaining within the scope of the present invention.

EXAMPLES

Examples 1, 2 and 3

Backings

The examples of the invention included polypropylene backings 14 having a first (textured) side 15 and a second (smoother) side 17 opposite the first side. The backings 14 are described in U.S. Pat. No. 4,237,889, the disclosure of which is hereby incorporated by reference.

The polypropylene backing 14 was of the type illustrated in FIG. 11 of U.S. Pat. No. 4,237,889 having ridges 20 and valleys 22 substantially parallel to the transverse direction of the backing. The backing 14, after coating the adhesive layer 16 and release coating 18, was subsequently slit in the machine direction (perpendicular to the transverse direction) to provide a tape 15.25 centimeters in width, the edges of which lay parallel to the original machine direction of the tape.

The dimensions of the textured surface of the backing 14 including the dimensions of the ridges 20 and valleys 22 of the backing are described in U.S. Pat. No. 4,237,889 column 5, lines 18 to 58. The crests of adjacent ridges of the backing 20 were from about 250 to 1200 micrometers apart and typically about 500 micrometers apart. The distance from the crest of the ridge 20 to valley 22 in the backing was about 75 micrometers. The distance from the second side of the backing 17 to the crest of the ridge 20 was about 90 microns.

Coating of Adhesive Layer

For Examples 1 and 2, the pressure sensitive adhesive layers 16 were hot-melt coated using rotary rod die coating methods known to those skilled in the prior art. The adhesive layer 16 of Example 3 was coated by hot-melt die coating methods known to those skilled in the prior art.

Coating of Release Layer

A thin layer of release coating 18 was coated onto the opposite face of the backing from that of the adhesive layer 16, using gravure coating techniques known to those skilled in the art. The urethane-based release coating composition was applied using a gravure (knurl) roll having an estimated theoretical wet volume of 2.7 bcm (billions cubic microns per square inch wet deposition) or $4 \times 10^{-4}$ milliliters per square centimeter.

In Examples 1, 2 and 3 of the invention, the release coating 18 was coated onto the second (smoother) side 17 of the backing 14 and the pressure-sensitive adhesive 16 was coated onto the first (textured) side 15 of the backing.

Comparative Examples C1 and C2

The same backing was used in the comparative examples C1 and C2 as was used in Example 1, 2 and 3.

In Comparative Examples C1 and C2, the release coating 18 was coated onto the first (textured) side 15 of the backing 14 and the adhesive layer 16 was coated onto the second (smoother) side 17 of the backing.

Test Methods

Adhesion to stainless steel was measured according to Test Method A of ASTM D3330/D 3330M-96 at a peel rate of 30.5 centimeters per minute. A sample of the tape 12 was applied to a stainless steel panel, and peeled from the panel in the 180 peel test.

Adhesion of the tape to itself was measured according to Test Method A of ASTM D3330/D 3330M-96 with the following additional sample preparation procedure: A first strip of the contaminant removal tape 12 was applied adhesive layer 16 side down to a stainless steel panel. A second strip of tape 12 from the same roll 10 was applied to the release coated side 17 of the first strip of tape. The second strip of tape 12 was peeled from the first strip of tape in a 180° peel adhesion test at a peel rate of 30.5 centimeters per minute.

Unwind force was measured according to ASTM D 3811-96. A chuck was made for mounting the coreless contaminant removal tape roll 10 onto the lower clamp of an Instron 1122 tensile tester. The unwind test was carried out on samples of 10.16 cm width at an unwind rate of 30.5 centimeters per minute. Results are given in Table 1 in units of Newtons per 100 mm width of tape.

Rolling ball tack of the adhesive layer 16 side of the tape 12 was measured according to ASTM D3121.

Tape unwind is a problem that can occur when an roll of tape is rolled back and forth on a substantially flat surface 98 to clean the surface. This tape unwind occurs when, during this back and forth action, the tape 12 sticks to the surface 98 and unwinds from the roll 10 and lays adhered along the surface. This is an undesirable problem which it is believed can be reduced by either one or both increasing the unwind force of the roll of tape 10 and decreasing the adhesion to the surface 98 to be cleaned.

Testing for this tape unwind problem was carried out by rolling an applicator 50' of general design shown in FIGS. 11 and 12 back and forth approximately 15 times on a surface 98. Two types of surface 98 were used in separate tests—an asbestos laboratory counter surface and a stainless steel laboratory surface. Adhesions to stainless steel tend to be relatively high and this is the more stringent test surface having the greatest capacity to cause tape unwind. If any tape unwind occurred at all, then this was noted as Y. If tape unwind did not occur, this was noted as N.

Applicators 50' Used in the Examples and Comparative Examples

The coated backing was slit, converted and made into coreless progressively-perforated lint rolls for clean-room applicator applications using techniques known in the art. Progressively perforated tape rolls are described and disclosed in U.S. Pat. No. 5,763,038, the disclosure of which is incorporated herein by reference. Coreless tape rolls are described and disclosed in U.S. Pat. No. 5,878,457, the disclosure of which is incorporated herein by reference. The applicators 50' (flat surface roller FSR type) taking rolls 10 of 10.2 cm (four inches) width used in these examples are available from 3M company under the name 836 FSR and 837 FSR from 3M Packaging Systems Division, 3M Center Building 220-8W-01, St. Paul, Minn. 55144-1000.

In all cases, the percentage of a component in a composition is given as percent by weight of that component of the coating composition unless otherwise specified.

Example 1

The release coating composition used was of the following type:

Toluene—98.75%

Polyvinyl octadecyl carbamate—1.25%

A suitable polyvinyl octadecyl carbamate is sold under the trade name RA-95H available from Mayzo Chemical, 6577 Peachtree Industrial Boulevard., Norcross, Ga.

The release composition was coated onto the second side 17 of the backing to give the release coating 18.

The pressure-sensitive adhesive 16 was hot-melt coated onto the first (textured) side 15 of the embossed backing 14. The pressure sensitive adhesive 16 had the following general composition:

Styrene-isoprene-styrene block copolymer—54%

Tackifier—46%

A suitable styrene-isoprene-styrene block copolymer is sold as Kraton 1107 available from Kraton Polymers, P.O. Box 2463, Houston, Tex.

A suitable example of a tackifier is thermoplastic tackifier such as Wingtack Extra available from Goodyear Chemical Tire Materials and Raw Material Adhesives and Latex, 1452 E Archwood Avenue, Akron, Ohio 44306-3296.

The hot-melt coating of the adhesive 16 and the gravure coating of the release coating 18 were carried out simultaneously at 160 meters per minute. The rotary rod hot-melt coating of the adhesive 16 may be carried out at a die temperature of about 195° C., the supply of the molten adhesive being maintained at temperatures of between 140° C. and 195° C. The release coating was dried at a temperature of about 74° C.

Example 1C

This was carried out as in EXAMPLE 1, except that the adhesive 16 was coated onto the second (smoother) side 17 of the backing and the release coating 18 was applied to the first (textured) side 15 of the embossed backing.

Example 2

The release coating 18 composition coated onto the second (smoother) side 17 of the embossed backing 14 was of the same composition as that in Example 1.

The general composition of the hot-melt adhesive coated onto the textured side of the backing was as follows:

Styrene-isoprene-styrene block copolymer—50%

Tackifier—30%

Liquid resin—20%

Liquid resin is Zonarez A25 available from Arizona Chemical, Jacksonville, Fla. 32225.

Example 2C

This was the carried out the same as in EXAMPLE 2 except that the adhesive 16 was coated onto the second (smoother) side 17 of the embossed backing 14 and the release coating 18 was applied to the first (textured) side 15 of the embossed backing.

Examples 3A and 3B

This example describes an alternative type of coating method for coating the adhesive layer 16 than the rotary rod coating method used for Examples 1, 1C, 2 and 2C. This example also uses a different release coating 18 composition. The release coating 18 was coated by the same general gravure method as for previous Examples 1, 1C, 2 and 2C. However, in Examples 3A and 3B, the pressure-sensitive adhesive layer was hot-melt coated according to die coating methods known in the art. While being entirely suitable for demonstrating the efficacy of the invention, the rotary rod method was found to be less convenient for continuous production of the contaminant removal tape.

The adhesive 16 coated in Examples 3a and 3B was the same adhesive as described in Example 1. The release coating 18 was different from previous examples and can be formulated and coated as described in U.S. Pat. Nos. 5,356,706 and 5,543,171 which are incorporated herein by reference.

Examples 3A and 3B differed from each other in coating weight of the adhesive 16. The coating weights are shown in Table 1.

Table 1 gives test results for the examples.

The results for Examples 1 and 2 in Table 1 show that coating the adhesive 16 on the first (textured) side 15 of the backing 14 as compared with the Comparative Examples 1C and 2C wherein the adhesive 16 is coated on the second (smoother) side 17 of the backing unexpectedly and advantageously give higher unwind force, but a lower adhesion to stainless steel and lower tack. Where there is a difference, there is less tape unwind while in use in Examples 1 and 2, than in the corresponding Comparative Examples 1C and 2C respectively. While not being limited to any particular theory of operation, it is believed that the higher unwind force, combined with lower adhesion force to the surface 98 to be cleaned, advantageously reduced the occurrence of the tape unwinding and adhering the surface, as illustrated by Examples 1 and 2, when compared to Comparative Examples 1C and 2C.

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A coreless roll of contaminant removal tape, comprising:
    a) a backing including a first side and a second side opposite said first side;
    b) a layer of adhesive on said first side of said backing, wherein said layer of adhesive is arranged so as to have discontinuous contact with a surface to which said roll is applied;
    wherein said roll includes a plurality of wraps of said tape with said layer of adhesive facing outwardly away from the center of the roll of tape.

2. The roll of contaminant removal tape of claim 1, wherein said layer of adhesive includes a first side and a second side opposite said first side, wherein said first side is a textured surface, and wherein said textured surface faces outwardly away from the center of the roll of tape.

3. The roll of contaminant removal tape of claim 1, wherein said layer of adhesive includes a plurality of raised portions.

4. The roll of contaminant removal tape of claim 3, wherein said layer of adhesive includes a first side and a second side opposite said first side, wherein said first side includes said plurality of raised portions and a plurality of recessed portions.

5. The roll of contaminant removal tape of claim 4, wherein a portion of said plurality of raised portions and a

TABLE 1

| Example | Adhesion to steel (N/100 mm) | Adhesion of the tape to itself (N/100 mm) | Unwind force (N/100 mm) | Rolling Ball (mm) | Tape Unwind, regular countertop | Tape Unwind, stainless steel countertop | Coating weight of adhesive (g/m2) | Adhesive on textured side |
|---|---|---|---|---|---|---|---|---|
| 1C | 42.2 | 3.8 | 1.71 | 113 | Y | Y | 12.72 | N |
| 1 | 7.4 | 6.9 | 3.01 | 246.5 | N | N | 11.74 | Y |
| 2C | 20.8 | 1.4 | 0.75 | 33.5 | Y | Y | 10.86 | N |
| 2 | 2.7 | 2.7 | 1.92 | 164.5 | N | N | 8.80 | Y |
| 3A | 15.9 | 3.0 | 3.77 | >300 | N | N | 13.48 | Y |
| 3B | 37.3 | 12.0 | 6.58 | >300 | N | N | 22.95 | Y | portion of said plurality of recessed portions are generally parallel to the transverse direction of said tape.

6. The roll of contaminant removal tape of claim 1, wherein said layer of adhesive is discontinuous.

7. The roll of contaminant removal tape of claim 6, wherein said layer of adhesive defines a plurality of raised portions, and further wherein the tape is characterized by an absence of adhesive between at least two adjacent raised portions.

8. The roll of contaminant removal tape of claim 1, wherein said first side of said backing includes a plurality of raised portions and a plurality of recessed portions.

9. The roll of contaminant removal tape of claim 8, wherein said layer of adhesive is a continuous layer of adhesive coated on said plurality of raised portions and said plurality of recessed portions.

10. The roll of contaminant removal tape of claim 9, wherein a portion of said plurality of raised portions and a portion of said plurality of recessed portions are generally parallel to the transverse direction of said tape.

11. The roll of contaminant removal tape of claim 10, wherein said second side of said backing is a generally smooth surface.

12. A coreless roll of contaminant removal tape, comprising:
   a) a backing including a first side and a second side opposite said first side;
   b) a layer of adhesive on said first side of said backing, wherein said layer of adhesive exhibits a discontinuous contact profile;
   wherein said roll includes a plurality of wraps of said tape with said layer of adhesive facing outwardly away from the center of the roll of tape.

13. The roll of contaminant removal tape of claim 12, wherein said layer of adhesive includes a first side and a second side opposite said first side, wherein said first side is a textured surface, and wherein said textured surface faces outwardly away from the center of the roll of tape.

14. The roll of contaminant removal tape of claim 12, wherein said layer of adhesive includes a plurality of raised portions.

15. The roll of contaminant removal tape of claim 14, wherein said layer of adhesive includes a first side and a second side opposite said first side, wherein said first side includes said plurality of raised portions and a plurality of recessed portions.

16. The roll of contaminant removal tape of claim 15, wherein a portion of said plurality of raised portions and a portion of said plurality of recessed portions are generally parallel to the transverse direction of said tape.

17. The roll of contaminant removal tape of claim 12, wherein said layer of adhesive is discontinuous.

18. The roll of contaminant removal tape of claim 17, wherein the discontinuous contact profile is characterized by a plurality of raised adhesive portions, at least two adjacent ones of which are separated by a non-adhesive region.

19. The roll of contaminant removal tape of claim 12, wherein said first side of said backing includes a plurality of raised portions and a plurality of recessed portions.

20. The roll of contaminant removal tape of claim 19, wherein said layer of adhesive is a continuous layer of adhesive coated on said plurality of raised portions and said plurality of recessed portions.

21. The roll of contaminant removal tape of claim 20, wherein said portion of said plurality of raised portions and a portion of said plurality of recessed portions are generally parallel to the transverse direction of said tape.

22. The roll of contaminant removal tape of claim 21, wherein said second side of said backing is a generally smooth surface.

23. A contaminant removal tape assembly, comprising:
   a) an applicator, comprising:
      i) a handle having a first end and a second end opposite the first end; and
      ii) a tape-receiving portion connected to said second end of said handle; and
   b) a coreless roll of contaminant removal tape mounted on said tape-receiving portion, wherein said roll of contaminant removal tape comprises:
      i) a backing including a first side and a second side opposite said first side;
      ii) a layer of adhesive on said first side of said backing, wherein said layer of adhesive is arranged so as to have discontinuous contact with a surface to which said roll is applied;
      wherein said roll includes a plurality of wraps of said tape with said layer of adhesive facing outwardly away from the center of the roll of tape.

24. The contaminant removal tape assembly of claim 23, wherein said layer of adhesive includes a plurality of raised portions.

25. The contaminant removal tape assembly of claim 24, wherein said layer of adhesive includes a first side and a second side opposite said first side, wherein said first side includes said plurality of raised portions and a plurality of recessed portions.

26. The contaminant removal tape assembly of claim 25, wherein said a portion of said plurality of raised portions and a portion of said plurality of recessed portions are generally parallel to the transverse direction of said tape.

27. The contaminant removal tape assembly of claim 23, wherein said layer of adhesive is discontinuous.

28. The contaminant removal tape assembly of claim 23, wherein said first side of said backing includes a plurality of raised portions and a plurality of recessed portions.

29. The contaminant removal tape assembly of claim 28, wherein said layer of adhesive is a continuous layer of adhesive coated on said plurality of raised portions and said plurality of recessed portions.

30. The contaminant removal tape assembly of claim 29, wherein a portion of said plurality of raised portions and a portion of said recessed portions are generally parallel to the transverse direction of said tape.

31. The contaminant removal tape assembly of claim 30, wherein said second side of said backing is a generally smooth surface.

32. The contaminant removal tape assembly of claim 23, wherein said tape-receiving portion further comprises a cylindrical surface.

33. The contaminant removal tape assembly of claim 23, wherein said handle further comprises a first flange, wherein said tape-receiving portion further comprises a first axle, and wherein said first axle of said tape-receiving portion is attached to said first flange of said handle.

34. The contaminant removal tape assembly of claim 33, wherein said handle further a second flange, wherein said tape-receiving portion further comprises a second axle, and wherein said second axle of said tape-receiving portion is attached to said second flange of said handle.

35. The contaminant removal tape assembly of claim 23, wherein said roll of contaminant removal tape is removeably mounted on said tape-receiving portion.

36. A contaminant removal tape assembly, comprising:
a) an applicator, comprising:
i) a handle having a first end and a second end opposite the first end; and
ii) a tape-receiving portion connected to said second end of said handle; and
b) a roll of contaminant removal tape mounted on said tape-receiving portion, wherein said roll of contaminant removal tape comprises:
i) a backing including a first side and a second side opposite said first side;
ii) a layer of adhesive on said first side of said backing, wherein said layer of adhesive exhibits a discontinuous contact profile;
wherein said roll includes a plurality of wraps of said tape with said layer of adhesive facing outwardly away from the center of the roll of tape.

37. The contaminant removal tape assembly of claim 36, wherein said layer of adhesive includes a plurality of raised portions.

38. The contaminant removal tape assembly of claim 37, wherein said layer of adhesive includes a first side and a second side opposite said first side, wherein said first side includes a plurality of raised portions and a plurality of recessed portions.

39. The contaminant removal tape assembly of claim 38, wherein said a portion of said plurality of raised portions and a portion of said plurality of recessed portions are generally parallel to the transverse direction of said tape.

40. The contaminant removal tape assembly of claim 36, wherein said first side of said backing includes a plurality of raised portions and a plurality of recessed portions.

41. The contaminant removal tape assembly of claim 40, wherein said layer of adhesive is a continuous layer of adhesive coated on said plurality of raised portions and said plurality of recessed portions.

42. The contaminant removal tape assembly of claim 41, wherein a portion of said plurality of raised portions and a portion of said plurality of recessed portions are generally parallel to the transverse direction of said tape.

43. The contaminant removal tape assembly of claim 42, wherein said second side of said backing is a generally smooth surface.

44. The contaminant removal tape assembly of claim 36, wherein said tape-receiving portion further comprises a cylindrical surface.

45. The contaminant removal tape assembly of claim 36, wherein said handle further comprises a first flange, wherein said tape-receiving portion further comprises a first axle, and wherein said first axle of said tape-receiving portion is attached to said first flange of said handle.

46. The contaminant removal tape assembly of claim 45, wherein said handle further a second flange, wherein said tape-receiving portion further comprises a second axle, and wherein said second axle of said tape-receiving portion is attached to said second flange of said handle.

47. The contaminant removal tape assembly of claim 36, wherein said roll of contaminant removal tape is removeably mounted on said tape-receiving portion.

48. A method of removing contaminants from a surface, comprising the steps of:
a) providing a contaminant removal tape assembly, wherein the contaminant removal tape assembly comprises:
i) an applicator, wherein the applicator comprises:
a handle having a first end and a second end opposite the first end; and
a tape-receiving portion connected to the second end of the handle; and
ii) a coreless roll of contaminant removal tape mounted on the tape-receiving portion, wherein the roll of contaminant removal tape comprises:
a backing including a first side and a second side opposite the first side;
a layer of adhesive on the first side of the backing, wherein the layer of adhesive is arranged so as to have discontinuous contact with a surface to which the roll is applied;
wherein the roll includes a plurality of wraps of the tape with the layer of adhesive facing outwardly away from the center of the roll of tape; and
b) rolling the contaminant removal tape assembly along a surface such that the layer of adhesive discontinuously contacts the surface and the contaminants adhere to the layer of adhesive.

49. The method of removing contaminants from a surface of claim 48, wherein the layer of adhesive of one wrap of tape of the roll adheres greater to the backing of an adjacent wrap of the roll than the layer adhesive adheres to the surface.

50. A method of removing contaminants from a surface, comprising the steps of:
a) providing a contaminant removal tape assembly, wherein the contaminant removal tape assembly comprises:
i) an applicator, wherein the applicator comprises:
a handle having a first end and a second end opposite the first end; and
a tape-receiving portion connected to the second end of the handle; and
ii) a coreless roll of contaminant removal tape mounted on the tape-receiving portion, wherein the roll of contaminant removal tape comprises:
a backing including a first side and a second side opposite the first side;
a layer of adhesive on the first side of the backing, wherein said layer of adhesive exhibits a discontinuous contact profile;
wherein the roll includes a plurality of wraps of the tape with the layer of adhesive facing outwardly away from the center of the roll of tape; and
b) rolling the contaminant removal tape assembly along a surface such that the layer of adhesive discontinuously contacts the surface and the contaminants adhere to the layer of adhesive.

51. The method of removing contaminants from a surface of claim 50, wherein the layer of adhesive of one wrap of tape of the roll adheres greater to the backing of an adjacent wrap of the roll than the layer adhesive adheres to the surface.

* * * * *

UNITED STATES PATENT AND TRADEMARK OFFICE
CERTIFICATE OF CORRECTION

PATENT NO. : 6,865,765 B2
DATED : March 15, 2005
INVENTOR(S) : Aalbers, Barbara J.

It is certified that error appears in the above-identified patent and that said Letters Patent is hereby corrected as shown below:

Column 20,
Line 59, delete "first" and insert -- second --, therefore;

Column 21,
Line 7, after "a" insert -- coreless --.

Signed and Sealed this

Nineteenth Day of July, 2005

JON W. DUDAS
*Director of the United States Patent and Trademark Office*